(12) United States Patent
Zhang et al.

(10) Patent No.: US 11,422,070 B2
(45) Date of Patent: Aug. 23, 2022

(54) SAMPLING PROBE, AUTOMATIC SAMPLING DEVICE, AND CONTAINER DETECTION SYSTEM

(71) Applicants: NUCTECH COMPANY LIMITED, Beijing (CN); Tsinghua University, Beijing (CN)

(72) Inventors: Qingjun Zhang, Beijing (CN); Yuanjing Li, Beijing (CN); Zhiqiang Chen, Beijing (CN); Jianmin Li, Beijing (CN); Shangmin Sun, Beijing (CN); Yaohong Liu, Beijing (CN); Weiping Zhu, Beijing (CN); Qiufeng Ma, Beijing (CN); Ge Li, Beijing (CN); Biao Cao, Beijing (CN); Zheng Liang, Beijing (CN); Ying Li, Beijing (CN); Yu Hu, Beijing (CN)

(73) Assignees: NUCTECH COMPANY LIMITED, Beijing (CN); Tsinghua University, Beijing (CN)

( * ) Notice: Subject to any disclaimer, the term of this patent is extended or adjusted under 35 U.S.C. 154(b) by 158 days.

(21) Appl. No.: 16/989,123

(22) Filed: Aug. 10, 2020

(65) Prior Publication Data

US 2021/0048376 A1 Feb. 18, 2021

(30) Foreign Application Priority Data

Aug. 12, 2019 (CN) .......................... 201910741990.7

(51) Int. Cl.
*G01N 1/24* (2006.01)
*G01N 27/622* (2021.01)

(52) U.S. Cl.
CPC ............. *G01N 1/24* (2013.01); *G01N 27/622* (2013.01)

(58) Field of Classification Search
CPC .................. H01J 49/0422; B25J 11/00; G01N 2001/2291; G01N 2001/022; G01N 1/2226; G01N 1/2273; G01N 1/24; G01N 27/622
(Continued)

(56) References Cited

U.S. PATENT DOCUMENTS

| 4,718,268 A * | 1/1988 | Reid ...................... G01V 9/007 |
| | | 73/19.01 |
| 2007/0023677 A1* | 2/2007 | Perkins ................. H01J 49/168 |
| | | 250/288 |
| 2011/0240844 A1* | 10/2011 | Ouyang .............. H01J 49/0409 |
| | | 250/288 |

FOREIGN PATENT DOCUMENTS

| CN | 2581914 Y | 10/2003 |
| CN | 101629933 A | 1/2010 |

(Continued)

OTHER PUBLICATIONS

Chinese Office Action for CN Application No. 201910741990.7 dated Aug. 6, 2021 (11 pages, with English translation 8 pages).

*Primary Examiner* — Jason L McCormack
(74) *Attorney, Agent, or Firm* — Merchant & Gould P.C.

(57) ABSTRACT

A sampling probe, an automatic sampling device, and a container detection system are provided. The sampling probe includes: a mounting base; a housing mounted on the mounting base, a first accommodation chamber having an opening being defined in the housing, and an exhaust hole in communication with the first accommodation chamber and outside of the housing being formed in the housing; a coupling portion formed on an outer edge of the opening of the first accommodation chamber and formed to be hermetically coupled with an air outlet of a container; and a suction device mounted on the housing and configured to suck gas in the container into the first accommodation chamber (Continued)

through the air outlet. The sampling probe may collect the odor of toxic and harmful gases/hazardous chemicals inside the container at the air outlet of the container, without destroying the overall structure of the container.

13 Claims, 4 Drawing Sheets

(58) Field of Classification Search
USPC .......................................... 73/31.03; 250/288
See application file for complete search history.

(56) References Cited

FOREIGN PATENT DOCUMENTS

| | | |
|---|---|---|
| CN | 105203357 A | 12/2015 |
| CN | 106769268 A | 5/2017 |
| CN | 107064361 A | 8/2017 |
| CN | 208026515 U | 10/2018 |
| CN | 109521482 A | 3/2019 |
| CN | 208819830 U | 5/2019 |

\* cited by examiner

SAMPLING PROBE, AUTOMATIC SAMPLING DEVICE, AND CONTAINER DETECTION SYSTEM

CROSS-REFERENCE TO RELATED APPLICATION

This application claims the benefit of Chinese Patent Application No. 201910741990.7 filed on Aug. 12, 2019 in the State Intellectual Property Office of China, the whole disclosure of which is incorporated herein by reference.

TECHNICAL FIELD

Embodiments of the present disclosure relate to a detection system adapted to detect a specific gas in a container, and in particular to a sampling probe adapted to detect a specific gas in a container, an automatic sampling device comprising the sampling probe, and a container detection system comprising the sampling probe.

BACKGROUND

Currently, radiation imaging technology has been widely used in the security inspection of large containers, especially for the detection of high-density substances in the containers that render radiation intensity to have a significant attenuation. However, it is difficult for the radiation imaging technology to detect and identify low atomic number and low density substances such as toxic and harmful gases, fumigants, high-flammable gases, trace drugs, explosives, and the like in containers. On the other hand, photoionization, Fourier transform infrared spectroscopy, microbalance, surface acoustic wave, and combined gas chromatography-ion mobility spectroscopy technique are very suitable for the detection of toxic and harmful gases, chemical warfare agents and high-flammable gases.

A hazardous chemical detection system has been developed. The hazardous chemical detection system is equipped with at least two sampling intake points on a fixed mounting frame to extract odor molecules volatilized from hazardous chemicals in the container, and then respectively carries ion migration detector, biosensor and nanowire chain reaction sensor to detect hazardous chemicals. However, on the one hand, due to the relatively sealed container body, volatile samples can only spread out from the container door seam and container ventilator, and the volatile amount is limited; on the other hand, the mounting frame is far away from the container, and the toxic and harmful gas/hazardous chemical samples volatilized outside the container will be diluted quickly after combining with the air outside the container, so the collected samples are difficult to represent the actual conditions of the samples inside the container, the detection error is high, and it is easy to produce false negatives.

In addition, a container gas detection device has also been developed. When detecting toxic and harmful gases/hazardous chemicals in the container, the operator holds the sampling probe and inserts the sampling probe from a door seam of the container to suction and sample. On the one hand, the sampling is cumbersome and not intelligent, and may cause harm to the operator; on the other hand, forcibly sampling at the door seam of the container may damage the sampling probe or deteriorate the waterproof performance of the container.

SUMMARY

The purpose of the present disclosure is to solve at least one aspect of the above-mentioned problems and defects existing in the prior art.

According to an embodiment of one aspect of the present disclosure, there is provided a sampling probe, comprising: a mounting base; a housing mounted on the mounting base, a first accommodation chamber having an opening being defined in the housing, and an exhaust hole in communication with the first accommodation chamber and outside of the housing being formed in the housing; a coupling portion formed on an outer edge of the opening of the first accommodation chamber and formed to be hermetically coupled with an air outlet of a container; and a suction device mounted on the housing and configured to suck gas in the container into the first accommodation chamber through the air outlet.

According to an embodiment of the present disclosure, the housing comprises: an outer housing mounted on the mounting base, the suction device being mounted on the outer housing; an inner housing mounted in the outer housing; and a sealing material disposed between the outer housing and the inner housing, wherein the outer housing, the inner housing and the sealing material are provided to define a second accommodation chamber in communication with the first accommodation chamber, and the suction device and the exhaust hole are disposed on the outer housing and communicated with the second accommodation chamber.

According to an embodiment of the present disclosure, a filter screen is provided between the first accommodation chamber and the second accommodation chamber.

According to an embodiment of the present disclosure, a first shutter is provided on the filter screen and configured to switch on or off the communication between the first accommodation chamber and the second accommodation chamber.

According to an embodiment of the present disclosure, the sampling probe further comprises a blowing device mounted on the housing and configured to blow air into the first accommodation chamber.

According to an embodiment of the present disclosure, the sampling probe further comprises a second shutter mounted on the housing and located at an inside of the blowing device, the second shutter being configured to switch on or off the communication between the blowing device and the first accommodation chamber.

According to an embodiment of the present disclosure, the coupling portion comprises a foam material disposed around the outer edge.

According to an embodiment of another aspect of the present disclosure, there is provided an automatic sampling device, comprising: the sampling probe according to any one of the foregoing embodiments; and a robot comprising: a mainbody, and a robot arm mounted on the mainbody, the sampling probe being mounted on the robot arm.

According to an embodiment of the present disclosure, the robot arm and the mounting base of the sampling probe are detachably connected by a flange mechanism.

According to an embodiment of yet another aspect of the present disclosure, there is provided a container detection system, comprising: the sampling probe according to any one of the foregoing embodiments, and a detection device comprising an ion mobility spectrometer that is communicated with the first accommodation chamber through the exhaust hole to receive the gas in the first accommodation chamber.

According to an embodiment of the present disclosure, the container detection system further comprises a robot. The robot comprises: a mainbody; and a robot arm mounted on the mainbody, the sampling probe being mounted on the robot arm.

According to an embodiment of the present disclosure, the detection device further comprises an auxiliary sampling device configured to deliver the gas collected in the first accommodation chamber to the ion mobility spectrometer through the exhaust hole.

According to an embodiment of the present disclosure, the auxiliary sampling device comprises: a first three-way valve having a first end in communication with the exhaust hole; a sampling tube having a first end in communication with a second end of the first three-way valve; a second three-way valve having a first end in communication with a second end of the sampling tube and a second end in communication with an input end of the ion mobility spectrometer; and a sampling pump in communication with a third end of the second three-way valve to suck the gas in the first accommodation chamber into the sampling tube.

According to an embodiment of the present disclosure, the auxiliary sampling device further comprises a feedback pipeline having a first end in communication with an output end of the ion mobility spectrometer and a second end in communication with a third end of the first three-way valve.

BRIEF DESCRIPTION OF THE ACCOMPANYING DRAWINGS

DETAILED DESCRIPTION

Figure 1:
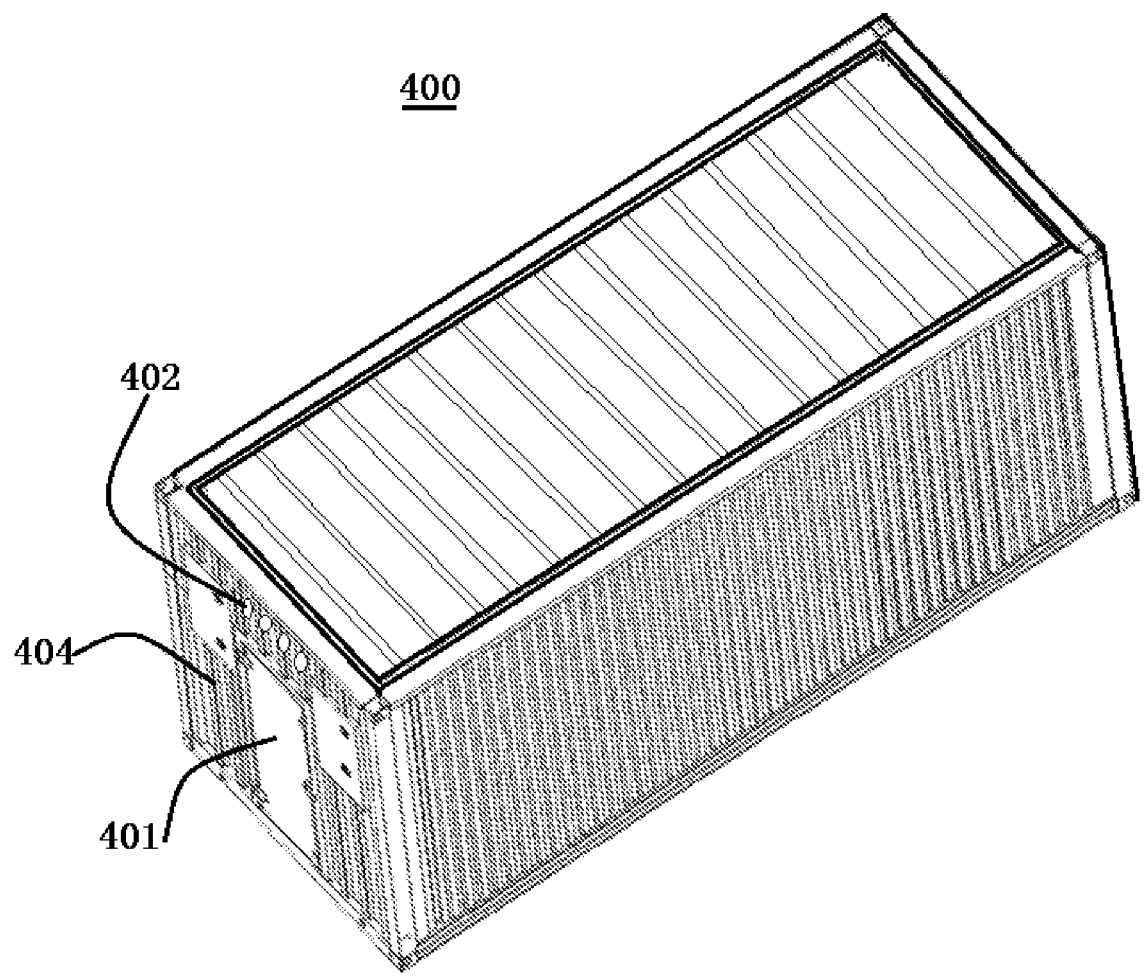
FIG. 1 illustrates a schematic perspective view of a container according to an exemplary embodiment.

The technical solutions in the embodiments of the present disclosure will be described clearly and completely in combination with the drawings in the embodiments of the present disclosure. Obviously, the described embodiments are only a part of the embodiments of the present disclosure, not all of them. The following description of at least one exemplary embodiment is actually illustrative only, and in no way serves as any limitation to the present disclosure and its application or use. Based on the embodiments in the present disclosure, all other embodiments obtained by those ordinary skilled in the art without carrying out inventive effort fall within the protection scope of the present disclosure.

In the following detailed description, for ease of explanation, many specific details are set forth to provide a comprehensive understanding of the embodiments of the present disclosure. Obviously, however, one or more embodiments can be implemented without these specific details. In other cases, well-known structures and devices are shown in diagrammatic form to simplify the drawings. Techniques, methods and equipment known to those ordinary skilled in the related art may not be discussed in detail, but where appropriate, the techniques, methods and equipment should be considered as part of the authorized specification.

In the description of the present disclosure, it should be understood that the use of "first", "second" and other words to define parts is only to facilitate the distinction between the corresponding parts, and unless otherwise stated, the above words do not have special meanings, and therefore cannot be understood as a limitation to the protection scope of the present disclosure.

According to a general inventive concept of the present disclosure, there is provided a sampling probe, comprising: a mounting base; a housing mounted on the mounting base, a first accommodation chamber having an opening being defined in the housing, and an exhaust hole in communication with the first accommodation chamber and outside of the housing being formed on the housing; a coupling portion formed on an outer edge of the opening of the first accommodation chamber and formed to be hermetically coupled with an air outlet of a container; and a suction device mounted on the housing and configured to suck gas in the container into the first accommodation chamber through the air outlet.

According to another general inventive concept of the present disclosure, an automatic sampling device is provided, comprising the above-mentioned sampling probe, and a robot comprising: a mainbody; and a robot arm mounted on the mainbody, the sampling probe being mounted on the robot arm.

According to another general inventive concept of the present disclosure, there is provided a container detection system, comprising: the above-mentioned sampling probe; and a detection device comprising an ion mobility spectrometer that is communicated with the first accommodation chamber through the exhaust hole to receive the gas in the first accommodation chamber.

According to an embodiment of the present disclosure, the container detection system is adapted to detect low atomic number and low density substances such as toxic and harmful gases, fumigants, high-flammable gases, trace drugs, explosives and the like in a container. As shown in FIG. 1, in one embodiment, the container 400 is provided with an opening 401 at one end thereof. Generally, air inlets or air outlets 402 are provided at the front and rear ends of the container, respectively, and the air inlets and air outlets are provided at the upper and lower portions of the front and rear ends of the container, respectively, so as to form gas convection inside the container, thus avoiding decay and deterioration of goods in the container and reducing internal temperature.

The container detection system according to the exemplary embodiment of the present disclosure comprises a sampling probe 100 and a detection device 200.

In an exemplary embodiment, referring to FIGS. 1-4, the sampling probe 100 comprises a mounting base 1, a housing 2, a coupling portion 3 and a suction device 4. The housing 2 is mounted on the mounting base 1. In an exemplary embodiment, the mounting base 1 may be integrally formed with the housing, or the mounting base may be detachably mounted on the housing 2. A first accommodation chamber 21 having an opening 22 is defined in the housing 2. The coupling portion 3 is formed on an outer edge 221 of the opening 22 of the first accommodation chamber 21 and formed to be hermetically coupled with the air outlet 402 of the outer box body of the container 400. The size of the opening 22 is designed to cover at least one air outlet 402 so that the gas in the container 400 may flow into the first accommodation chamber 21 through the air outlet 402. The suction device 4 is mounted on the housing 1 and configured to suck the gas in the container 400 into the first accommodation chamber 21 through the air outlet 402. For example, the suction device 4 comprises a blower and is mounted on an outer housing 26. An exhaust hole 5 in communication with the first accommodation chamber 21 and the outside of the housing 2 is formed in the housing 2 to exhaust the gas in the first accommodation chamber 21. The detection device 200 comprises an ion mobility spectrometer 8 that is communicated with the first accommodation chamber 21 through the exhaust hole 5 to receive the gas in the first accommodation chamber 21.

The ion mobility spectrometer (IMS) 8 may comprise, for example, a positive-negative dual-mode ion mobility tube, such as an integrated ceramic dual-mode mobility tube. The ion mobility spectrometer 8 may also comprise a positive or negative single-mode ion mobility tube. The ion mobility spectrometer has the advantages of portability, rapidity, sensitivity and industrialization, and is widely used to measure the presence and dose of toxic and harmful gases and/or hazardous chemicals. The sampling probe 100 of the embodiment of the present disclosure may be attached to the air outlet 402 of the container 400 to collect the gas in the container 400.

In an embodiment, the housing 2 comprises an outer housing 26, an inner housing 27, and a sealing material 23. The outer housing 26 is mounted on the mounting base 1, and the suction device 4 is mounted on the outer housing 26. The inner housing 27 is mounted in the outer housing 26. The sealing material 23 is provided between the outer housing 26 and the inner housing 27. The outer housing 26, the inner housing 27 and the sealing material 23 are constructed to define a second accommodation chamber 28 in communication with the first accommodation chamber 21. The suction device 4 and the exhaust hole 5 are disposed on the outer housing 26 and communicate with the second accommodation chamber 28.

In an embodiment, a filter screen 24 is provided between the first accommodation chamber 21 and the second accommodation chamber 28 to filter the gas entering the second accommodation chamber. Further, a first shutter 25 is provided on the filter screen 24, and the first shutter 25 is configured to switch on or off the communication between the first accommodation chamber 21 and the second accommodation chamber 28. In this way, the sampled gas may be temporarily stored in the second accommodation chamber 28, and the gas in the second accommodation chamber may have a predetermined pressure, thereby facilitating a further delivery into the ion mobility spectrometer.

Figure 2:
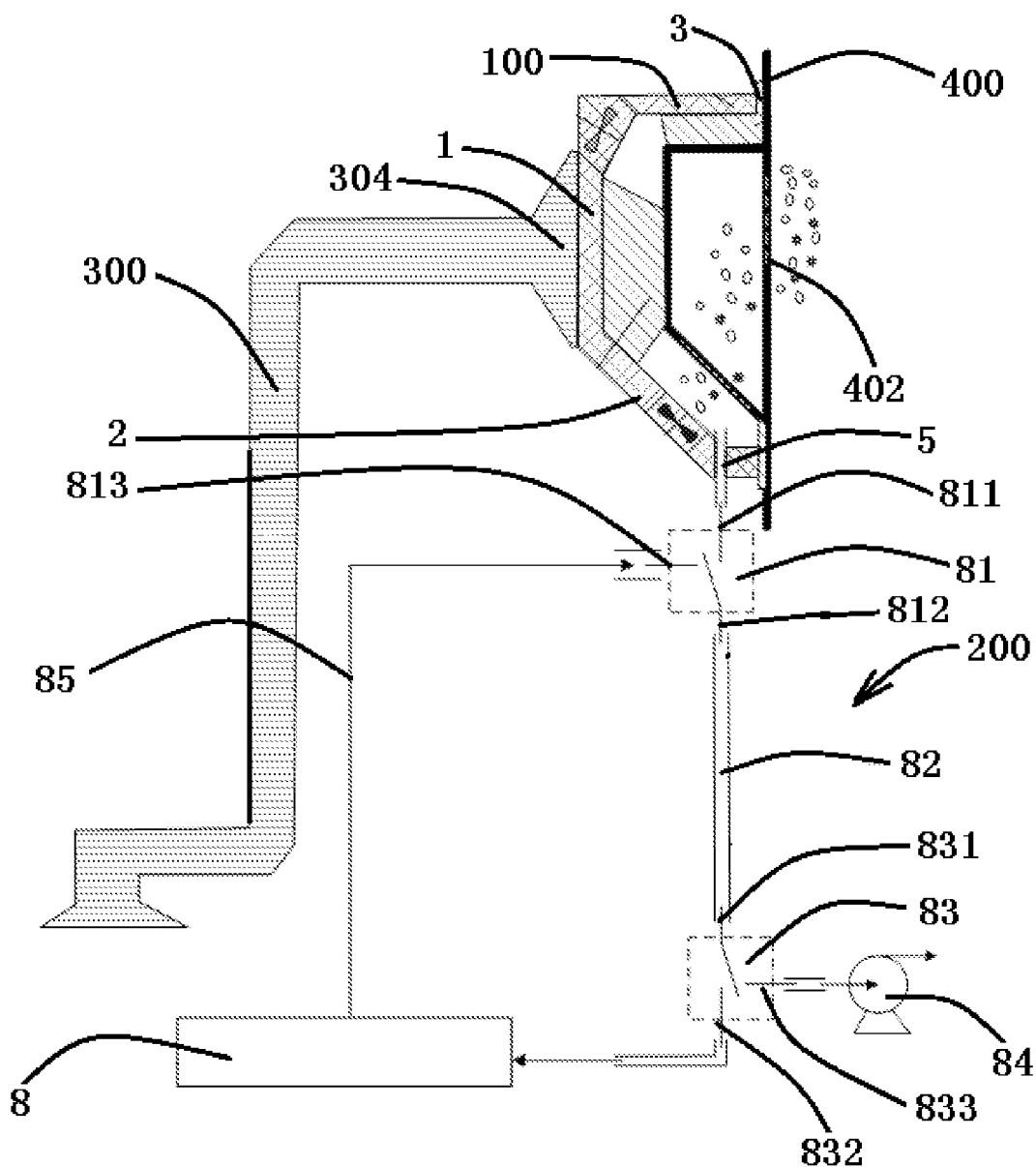
FIG. 2 illustrates a principle schematic view of a container detection system according to an exemplary embodiment of the present disclosure.
Figure 3:
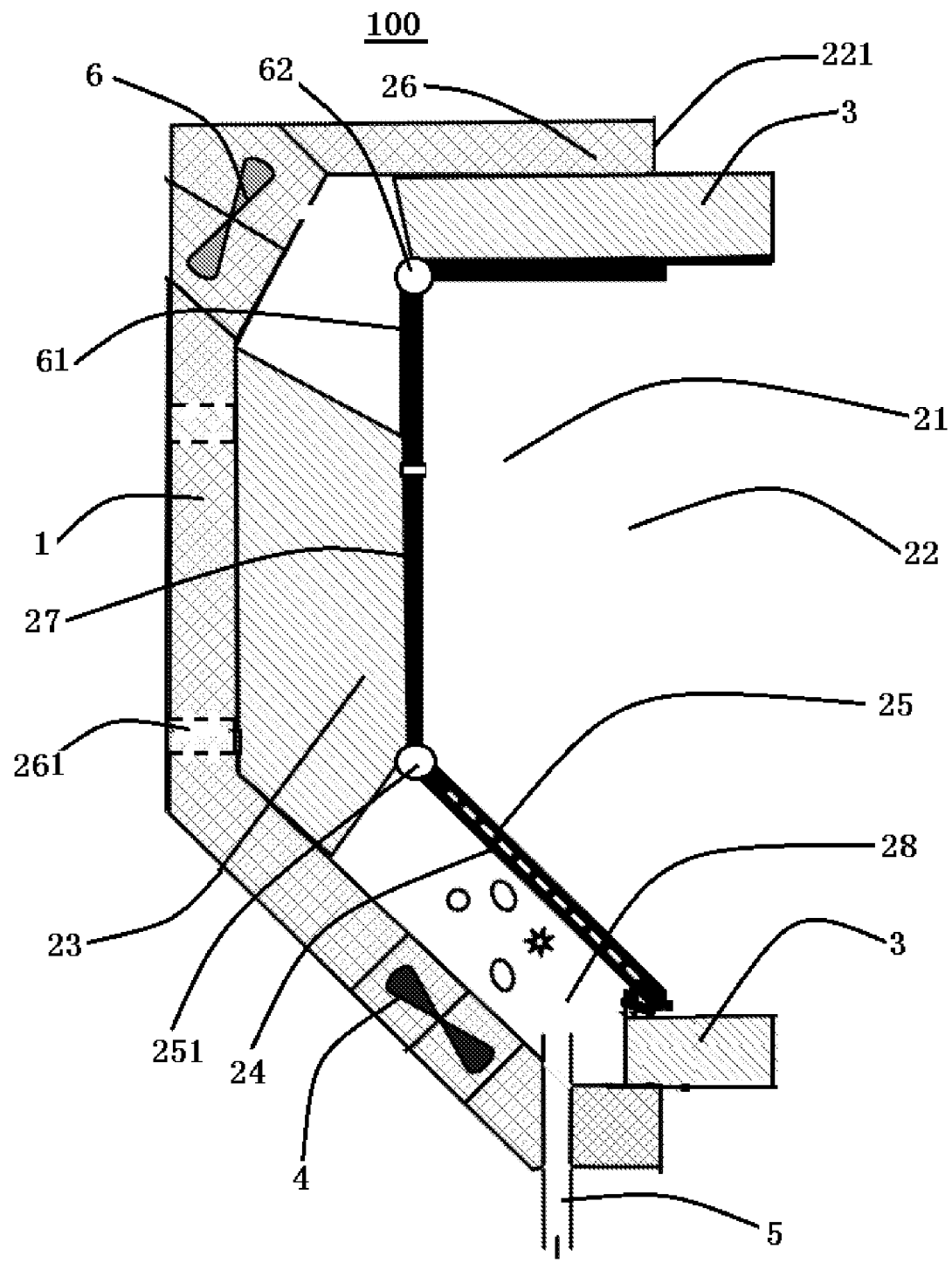
FIG. 3 illustrates a principle schematic view of a sampling probe according to an exemplary embodiment of the present disclosure.

As shown in FIGS. 1-3, in an exemplary embodiment, the sampling probe 100 further comprises a blowing device 6 mounted on the housing 2, the blowing device 6 being configured to blow gas into the first accommodation chamber. For example, the blowing device 6 comprises a blower and is mounted on the outer housing 26. Further, the sampling probe 100 further comprises a second shutter 61 mounted on the housing 2 and located at an inside of the blowing device 6, the second shutter 61 being configured to switch on or off the communication between the blowing device 6 and the first accommodation chamber 21 by rotating around a pivot 62. In this way, before the sampling probe 100 is attached to the container 400, the first shutter 25 and the suction device 4 are closed, the second shutter 61 is opened, and the blowing device 6 is activated to blow out dust and other impurities adhered to the vicinity of the air outlet 402; after that, the sampling probe 100 is attached to a surface of the container 400 and covers the air outlet; and then, the blowing device 6 and the second shutter 61 are closed, the first shutter is opened, and the suction device 4 is activated to suck the gas in the container into the first and second accommodation chambers. Although FIGS. 2 and 3 show an embodiment in which the blowing device 6 is disposed on the outer housing 26, the embodiments of the present disclosure are not limited thereto. It is understood that the blowing device may be disposed at the outer housing 26 or the inner housing 27 of the housing 2, or a position between the outer housing and the inner housing.

In an embodiment, the coupling portion 3 comprises a foam material or a sponge material disposed around the outer edge. Since the outer surface of the container 400 is formed as a corrugated structure 404, the foam material or the sponge material is deformed when the sampling probe 100 is attached to the outside of the container, thereby reliably sealing the outer edge 221 of the opening 22 of the sampling probe 100 and the outer surface of the container 100. It is understood that the sealing material seals the peripheries of the suction device 4 and the blowing device 6, thereby improving the sealing performance of the first and second accommodation chambers with respect to the external environment when the sampling probe 100 is attached to the outer surface of the container 400.

Figure 4:
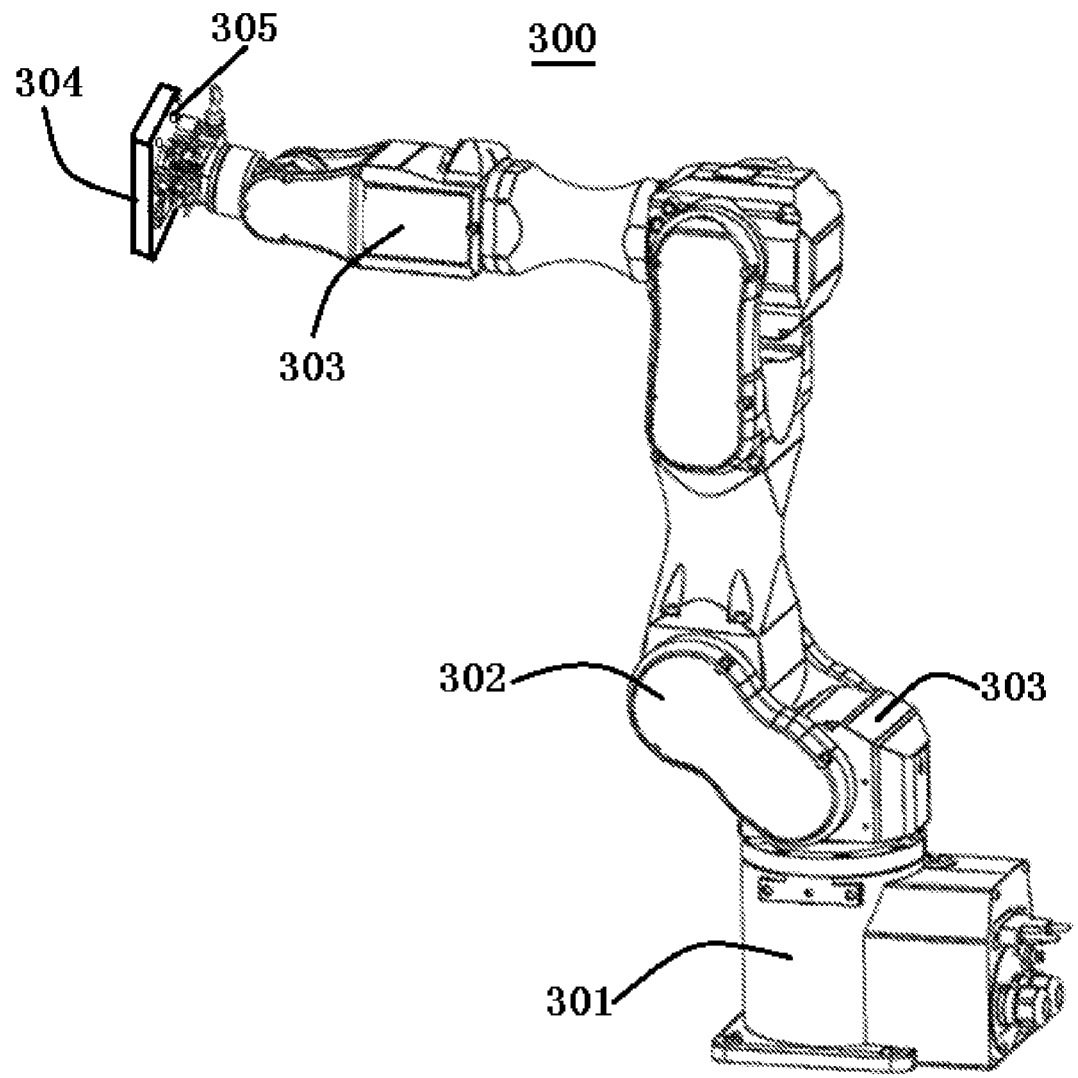
FIG. 4 illustrates a schematic perspective view of a robot according to an exemplary embodiment of the present disclosure.

Referring to FIGS. 2-4, according to an embodiment of another aspect of the present disclosure, there is provided an automatic sampling device, comprising: the sampling probe 100 described in any one of the above embodiments; and a robot 300 adapted to control the sampling probe 100. The robot 300 comprises a mainbody and a robot arm 304 mounted on the mainbody, the sampling probe 100 being mounted on the robot arm 304. According to an exemplary embodiment of the present disclosure, the robot 300 comprises a base 301, a rotation mechanism 303 adapted to rotate by 360-degree, and a pivot mechanism 302 adapted to bend, so that the robot arm 304 may reach a predetermined position and be positioned at a predetermined gesture. The robot includes but is not limited to four-axis, six-axis robots or other types of multi-degree-of-freedom robots. The robot 300 may rotate, or move up and down or left and right according to a pre-programmed procedure, so as to move the sampling probe to a desired position and perform related operations.

In an embodiment, the robot arm 304 and the mounting base 1 of the sampling probe 100 are detachably connected by a flange mechanism. For example, the robot arm 304 comprises a flange provided with a plurality of through holes 305 which correspond to through holes 261 in the mounting base 1 of the sampling probe 200, respectively, so as to mount the sampling probe 100 on the robot arm 304 with bolts.

In an embodiment, as shown in FIGS. 2 and 3, the detection device 200 of the container detection system further comprises an auxiliary sampling device configured to transmit the gas collected in the first accommodation chamber 21 to the ion mobility spectrometer 8 through the exhaust hole 5. The auxiliary sampling device comprises a first three-way valve 81, a sampling tube 82, a second three-way valve 83, and a sampling pump 84. The first three-way valve 81 has a first end 811 in communication with the exhaust hole 5. The sampling tube 82 has a first end (the upper end in FIG. 2) in communication with a second end 812 of the first three-way valve 81. The second three-way valve 83 has a first end 831 in communication with a second end (the lower end in FIG. 2) of the sampling tube 82 and a second end 832 in communication with an input end of the ion mobility spectrometer 8. The sampling pump 84 has an input end in communication with a third end 833 of the second three-way valve 83 to suck the gas in the first accommodation chamber 21 into the sampling tube 82.

For example, in an embodiment, the sampling tube 82 may comprise a stainless steel tube with a certain strength (for example, an outer diameter thereof does not exceed 5 mm). The first end 811 of the sampling tube 82 in communication with the exhaust hole 5 is provided with a temperature control device, which is adapted to make the stainless steel tube operate at a specific temperature and facilitate the cleaning of residual samples therein. The first end 811 is also provided with a microporous filter screen to prevent dust or particles from clogging the sampling tube 82 during the sampling process.

In an embodiment, the auxiliary sampling device further comprises a feedback pipeline 85 having a first end in communication with an output end of the ion mobility spectrometer 8 and a second end in communication with a third end 813 of the first three-way valve 81. In this way, at least part of the gas discharged from the ion mobility spectrometer 8 may be returned to the sampling tube 82 and used as a carrier gas. In this way, since the gas discharged from the ion mobility spectrometer 8 may be used as the carrier gas to be recycled, it is unnecessary to provide an external or built-in gas tank for providing such carrier gas, thus saving gas materials, simplifying the entire device, improving portability, and reducing detection cost. It should be known that various tubes, such as a glass tube, a steel tube, a connecting tube and/or the like are connected between the sampling tube 82 and the ion mobility spectrometer 8 to form an airtight gas path, that is, a circulating gas path. The circulating gas path comprises multiple gas flow paths in order to achieve multiple functions.

According to the container detection system of the above embodiment of the present disclosure, the outer contour of the sampling probe 100 is designed as a rectangular trumpet according to the arrangement of the standard container air outlet 402, and the blowing device 6 and the suction device 4 are provided at an upper portion of a back of the housing 2 and a lower portion of the housing 2, respectively. By providing the blowing device 6, during the process that the robot 300 drives the sampling probe 100 to approach the container air outlet 402, the air outlet 402 and its nearby surface may be purged for dust removal and dehumidification to prevent the influence of dust and moisture on the detection device. After the process of dust removal and dehumidification is completed, the blowing device 6 stops working. The robot arm 304 drives the sampling probe 100 to further adhere to the air outlet 402 and activates the suction device 4 to sample the gas in the container 400. The sealing material 23 such as a sponge provided at the outer edge 221 of the opening 22 of the sampling probe 100 and between the outer housing 26 and the inner housing 27 may ensure that the sampling probe 100 is tightly fit to the irregular corrugated structure of the outer surface of the container 400 and an convex waterproof cover of the air outlet, which strengthens the lateral and axial sealing between the sampling probe and the container, ensuring that the gas inside the container may be collected effectively during the primary sampling.

Further, during the process that the sampling probe 100 collects the gas sample molecules volatilized in the container 400 into the sampling tube 82, the first end of the sampling tube 82 is communicated with the second end 812 of the first three-way valve 81 (on-position 1), and the third end 833 of the second three-way valve 83 is communicated with the sampling pump 84, so that the gas sample molecules collected by the suction device 4 from the interior of the container 400 into the second accommodation chamber 28 are collected and stored in the sampling tube 82. After that, the second end 832 of the second three-way valve 83 is communicated with the ion mobility spectrometer 8, and the gas sample molecules collected and stored in the sampling tube 82 are carried into the ion mobility spectrometer 9 for detection and analysis through the chromatographic sample carrier gas. In this way, the container detection system of the present disclosure may implement two-stage sampling, and the volume and power consumption of the sampling pump may be reduced.

By controlling the second three-way valve 83, the time for quickly turning on and off the gas path for sampling is shortened, and a stage pulse sampling is realized. For example, the pulse sampling time may be as low as the millisecond level, and the minimum sampling volume of a single pulse may be as low as the microliter level (such as sampling gas flow of 1 L/min). This direct sampling method of pulse sampling in milliseconds or hundreds of milliseconds may not only improve the sensitivity of trace sniffing, but also minimize the impact of the harsh external detection environment on the accuracy of ion mobility detection.

According to the container detection system provided by the above embodiments of the present disclosure, the sampling probe 100 may collect the odor of toxic and harmful gases/hazardous chemicals inside the container at the air outlet 402 of the container, without destroying the overall structure of the container. The sampling probe automatically finds the air outlet of the container using the robot arm, which facilitates integration with the large-scale container vehicle security inspection system, and the positioning speed and sampling efficiency are higher than the manual mode. The use of two-stage sampling technology and sponge sealing technology reduces the container sampling difficulty and achieves a high sampling efficiency.

It should be appreciated by those skilled in this art that the above embodiments are intended to be illustrative, and many modifications may be made to the above embodiments by those skilled in this art, and various structures described in various embodiments may be freely combined with each other without conflicting in configuration or principle.

Although the present disclosure is described with reference to the drawings, the embodiments disclosed in the drawings are for illustrative purposes only and are not to be construed as limiting the present disclosure. Although some embodiments of the inventive concept of the present disclosure have been illustrated and described, it should be understood by those ordinary skilled in the art that these embodiments may be changed without departing from the principle and spirit of the general inventive concept of the present disclosure. The scope of the present disclosure is defined by the claims and their equivalents.

The invention claimed is:

1. A sampling probe, comprising:
a mounting base;
a housing mounted on the mounting base, a first accommodation chamber having an opening being defined in the housing, and an exhaust hole in communication with the first accommodation chamber and outside of the housing being formed in the housing;
a coupling portion formed on an outer edge of the opening of the first accommodation chamber and formed to be hermetically coupled with an air outlet of a container; and
a suction device mounted on the housing and configured to suck gas in the container into the first accommodation chamber through the air outlet,
wherein the housing comprises,
an outer housing mounted on the mounting base, the suction device being mounted on the outer housing, an inner housing mounted in the outer housing; and a sealing material provided between the outer housing and the inner housing, wherein the outer housing, the inner housing and the sealing material are provided to define a second accommodation chamber in communication with the first accommodation chamber, and the suction device and the exhaust hole are disposed on the outer housing and communicated with the second accommodation chamber.

2. The sampling probe according to claim 1, wherein a filter screen is provided between the first accommodation chamber and the second accommodation chamber.

3. The sampling probe according to claim 2, wherein a first shutter is provided on the filter screen and configured to switch on or off communication between the first accommodation chamber and the second accommodation chamber.

4. The sampling probe according to claim 1, further comprising a blowing device mounted on the housing and configured to blow air into the first accommodation chamber.

5. The sampling probe according to claim 4, further comprising a second shutter mounted on the housing and located at an inside of the blowing device, the second shutter being configured to switch on or off communication between the blowing device and the first accommodation chamber.

6. The sampling probe according to claim 1, wherein the coupling portion comprises a foam material disposed around the outer edge.

7. An automatic sampling device, comprising:
the sampling probe according to claim 1; and
a robot, comprising:
  a mainbody; and
  a robot arm mounted on the mainbody, the sampling probe being mounted on the robot arm.

8. The automatic sampling device according to claim 7, wherein the robot arm and the mounting base of the sampling probe are detachably connected by a flange mechanism.

9. A container detection system, comprising:
the sampling probe according to claim 1; and
a detection device comprising an ion mobility spectrometer that is communicated with the first accommodation chamber through the exhaust hole to receive gas in the first accommodation chamber.

10. The container detection system according to claim 9, further comprising: a robot comprising:
a mainbody; and
a robot arm mounted on the mainbody, the sampling probe being mounted on the robot arm.

11. The container detection system according to claim 9, wherein the detection device further comprises an auxiliary sampling device configured to transmit the gas collected in the first accommodation chamber to the ion mobility spectrometer through the exhaust hole.

12. The container detection system according to claim 11, wherein the auxiliary sampling device comprises:
a first three-way valve having a first end in communication with the exhaust hole;
a sampling tube having a first end in communication with a second end of the first three-way valve;
a second three-way valve having a first end in communication with a second end of the sampling tube and a second end in communication with an input end of the ion mobility spectrometer; and
a sampling pump that is communicated with a third end of the second three-way valve to suck gas in the first accommodation chamber into the sampling tube.

13. The container detection system according to claim 12, wherein the auxiliary sampling device further comprises a feedback pipeline having a first end in communication with an output end of the ion mobility spectrometer and a second end in communication with a third end of the first three-way valve.

* * * * *